(12) United States Patent
Bishop

(10) Patent No.: US 9,683,695 B2
(45) Date of Patent: *Jun. 20, 2017

(54) MOUNTING BRACKET FOR ELECTRIC FENCE MONITOR

(71) Applicant: John C. Bishop, Cookeville, TN (US)

(72) Inventor: John C. Bishop, Cookeville, TN (US)

( * ) Notice: Subject to any disclaimer, the term of this patent is extended or adjusted under 35 U.S.C. 154(b) by 246 days.

This patent is subject to a terminal disclaimer.

(21) Appl. No.: 14/563,682

(22) Filed: Dec. 8, 2014

(65) Prior Publication Data

US 2015/0199884 A1 Jul. 16, 2015

Related U.S. Application Data

(63) Continuation-in-part of application No. 14/099,042, filed on Dec. 6, 2013, now Pat. No. 9,472,087.

(51) Int. Cl.
*F16M 13/02* (2006.01)
*A01K 3/00* (2006.01)
*G08B 5/38* (2006.01)

(52) U.S. Cl.
CPC ............. *F16M 13/02* (2013.01); *A01K 3/005* (2013.01); *G08B 5/38* (2013.01)

(58) Field of Classification Search
CPC ........ F16M 13/02; F16M 11/04; A01K 3/005; G08B 5/38; E04H 17/20; E04H 17/08; E04H 17/10; E04H 17/1413; H01B 17/145

See application file for complete search history.

(56) References Cited

U.S. PATENT DOCUMENTS

| | | | | |
|---|---|---|---|---|
| 4,725,825 A | * | 2/1988 | McKean | G08B 5/36 256/10 |
| 5,302,945 A | * | 4/1994 | Stoltenberg | A01K 3/005 256/10 |
| 2001/0011950 A1 | * | 8/2001 | Carson | G08B 13/122 340/635 |

* cited by examiner

*Primary Examiner* — James Yang
(74) *Attorney, Agent, or Firm* — Waller Lansden Dortch & Davis, LLP; Mark A. Pitchford

(57) ABSTRACT

An electric fence monitoring system includes an electric fence monitor and an electric fence monitor mounting bracket. The electric fence monitor is operable to provide an audible and/or visual indicator of an operating condition (i.e., fault or no-fault) of an electric fence and electric fence box. The electric fence monitor is operable to remain continuously connected between the electric fence and earth ground during normal operation of the fence. The mounting bracket affixes to a standard safety post or T-post and supports the electric fence monitor. The mounting bracket connects the electric fence monitor to earth ground via the T-post. The mounting bracket slips over a top of the T-post at a first angle relative to the T-post and locks onto the T-post at a second angle relative to the T-post.

20 Claims, 12 Drawing Sheets

MOUNTING BRACKET FOR ELECTRIC FENCE MONITOR

CROSS-REFERENCES TO RELATED APPLICATIONS

This application is a continuation-in-part of U.S. patent application Ser. No. 14/099,042 entitled "ELECTRIC FENCE MONITOR INCLUDING AN AIR GAP" filed on Dec. 6, 2013.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to electric fence monitors. More particularly, this invention pertains to providing continual audible and visual indicators of an operating condition (i.e., presence or absence of a fault condition) of a segment or length of electric fence.

Electric fences are used by ranchers and farmers to keep animals in a designated area or out of a designated area. Electric fences include a length of conductive material (i.e., the fencing) isolated from earth ground by insulators. The length of conductive material is connected to a fence charger (i.e., electric fence box). Checking and repairing fences is a major part of a farmer or rancher's job often requiring significant time and/or manpower. Faults in the electric fence are caused by animals running through the fence, plants growing up to the electric fence, or plants (e.g., trees) falling on the electric fence. Determining a fault in an electric fence and finding the source of the fault is often time-consuming because the fence must be manually tested to track the source of the fault. In operation, the electric fence charger periodically sends a pulse of static electricity along the electric fence. Parasitic resistances and capacitances bleed much of the energy from the fence between pulses.

When working properly, the electric fence should periodically exhibit over 5000 volts on a tester when energized by the electric fence charger. A user momentarily connects the tester to the electric fence to determine a voltage on the fence. This process is repeated around the fence until the user determines a segment of the fence having the fault condition. Active, self-powered testers are limited by their battery life or to a location with powerline power available. Passive testers are capacitive or resistive based and draw down the voltage on the fence. Therefore, they cannot remain connected to the fence during normal operation (i.e., at all times). There are no passive testers that permanently connect to an electric fence to continually indicate the status (fault or no fault) of a length of electric fence between the tester and the electric fence charger (i.e., electric fence box).

Providing a stable earth ground connection to an electric fence tester or monitor is accomplished by driving a grounding spike into the ground and electrically connecting the electric fence monitor or tester to the grounding spike. However, this requires the additional part of a grounding spike, and a single grounding spike may not provide a sufficient connection to earth ground or may become insufficient over time (e.g., via corrosion).

Alternatively, in a multi-strand fence, a designated one of the fence strands can be electrically connected to standard steel T-posts (safety posts) supporting the fence strands. The T-posts are driven into the ground, connecting the designed fence strand to earth ground. The electric fence monitor or tester is connected to the designated fence strand, providing the earth ground for the electric fence monitor or tester. However, this method of providing earth ground results in the designated strand being grounded to earth ground and providing little containment in addition to that provided by the other fence strands.

BRIEF SUMMARY OF THE INVENTION

Aspects of the present invention provide an electric fence monitoring system including an electric fence monitor and an electric fence monitor mounting bracket. The electric fence monitor is operable to provide an audible and/or visual indicator of an operating condition (i.e., fault or no-fault) of an electric fence and electric fence box. The electric fence monitor is operable to remain continuously connected between the electric fence and earth ground during normal operation of the fence. The mounting bracket affixes to a standard safety post or T-post and supports the electric fence monitor. The mounting bracket connects the electric fence monitor to earth ground via the T-post. The mounting bracket slips over a top of the T-post at a first angle relative to the T-post and locks onto the T-post at a second angle relative to the T-post.

In one aspect, an electric fence monitor mounting bracket is configured to support electric fence monitor on a T-post having a central member, a frontal protrusion extending from a front face of the central member along a longitudinal axis of the T-post, and a stud protruding from a rear face of the central portion of the T-post along the longitudinal axis of the T-post. The electric fence monitor mounting bracket includes a first segment, a second segment, and a third segment. The first segment is at a distal end of the mounting bracket. The first segment is generally planar and comprises a first recess extending therethrough having a width at least as wide as the stud of the T-post and a length at least as long as the stud of the T-post. The second segment is generally planar and includes a second recess and a third recess. The second recess extends through the second segment, and the second recess has a width at least as wide as the central member of the T-post and a length at least 1.25 times a length of the central member of the T-post. The third recess extends through the second segment, and the third recess has a width at least as wide as the frontal protrusion of the T-post and a length at least 1.25 times a length of the frontal protrusion of the T-post. The first recess is open to the second recess and the second recess is open to the third recess. The third segment is at a proximal end of the bracket and is configured to support the electric fence monitor. The second segment connects the first segment to the third segment.

In another aspect, an electric fence monitoring system includes an electric fence monitor and an electric fence monitor mounting bracket. The electric fence monitor is operable to provide a visual indicator of an operating condition of the electric fence. The electric fence monitor mounting bracket is configured to support an electric fence monitor on a T-post having a central member, a frontal protrusion extending from a front face of the central member along a longitudinal axis of the T-post, and a stud protruding from a rear face of the central portion of the T-post along the longitudinal axis of the T-post. The electric fence monitor mounting bracket includes a first segment, a second segment, and a third segment. The first segment is at a distal end of the mounting bracket. The first segment is generally planar and comprises a first recess extending therethrough having a width at least as wide as the stud of the T-post and a length at least as long as the stud of the T-post. The second segment is generally planar and includes a second recess and a third recess. The second recess extends through the second segment, and the second recess has a width at least as wide as the central member of the T-post and a length at least 1.25 times a length of the central member of the T-post. The third recess extends through the second segment, and the third recess has a width at least as wide as the frontal protrusion of the T-post and a length at least 1.25 times a length of the frontal protrusion of the T-post. The first recess is open to the second recess and the second recess is open to the third recess. The third segment is at a proximal end of the bracket and is configured to support the electric fence monitor. The second segment connects the first segment to the third segment.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" means electrically connected when referring to electrical devices in circuit schematics or diagrams. The electrical connection may be direct or indirect (i.e., connected via one or more other elements).

Figure 1:
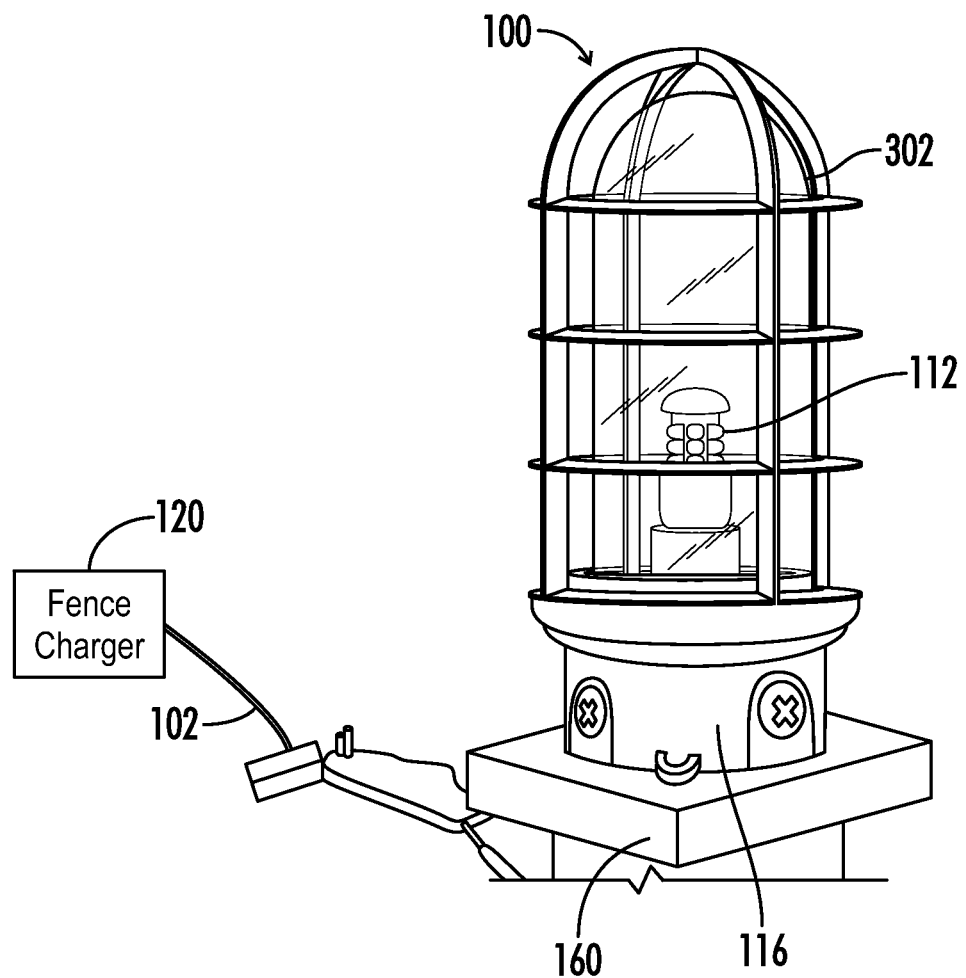
FIG. 1 is a side perspective view of an electric fence monitor operable to emit a visual indicator of an operating condition of an electric fence mounted or secured to a fence post.
Figure 2:
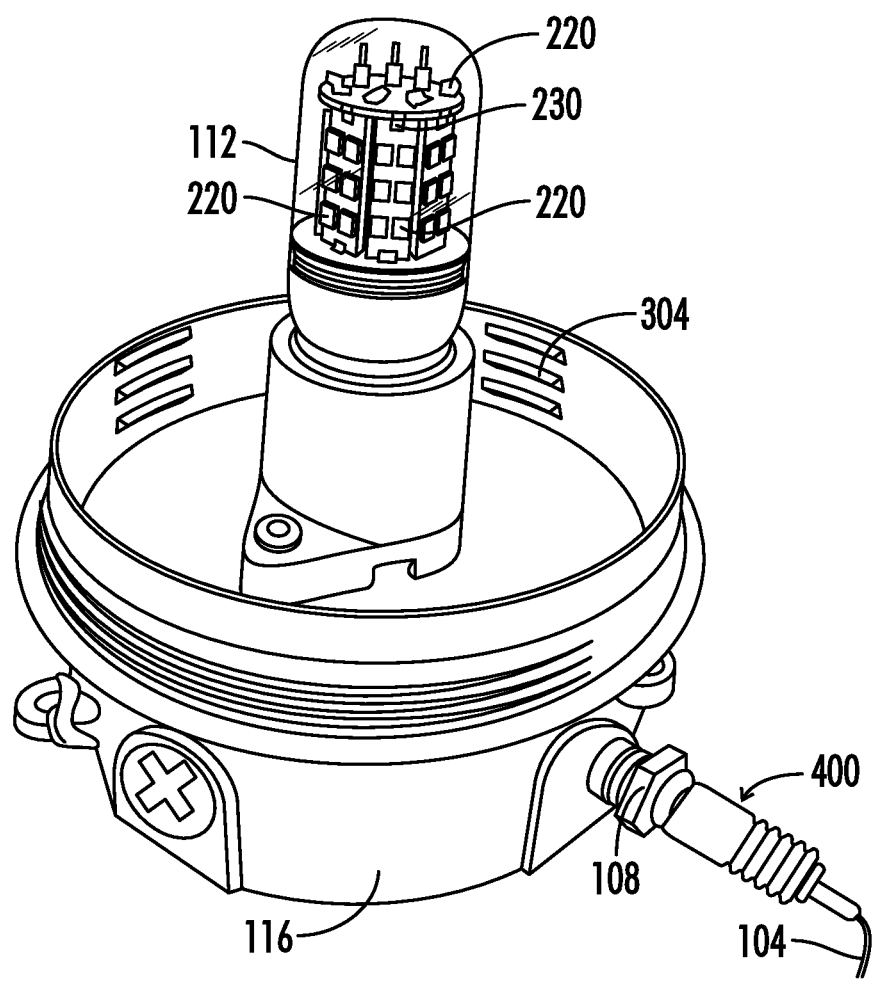
FIG. 2 is an isometric view of an electric fence monitor including internal first and second contacts operable to emit a visual indicator of an operating condition of an electric fence.
Figure 3:
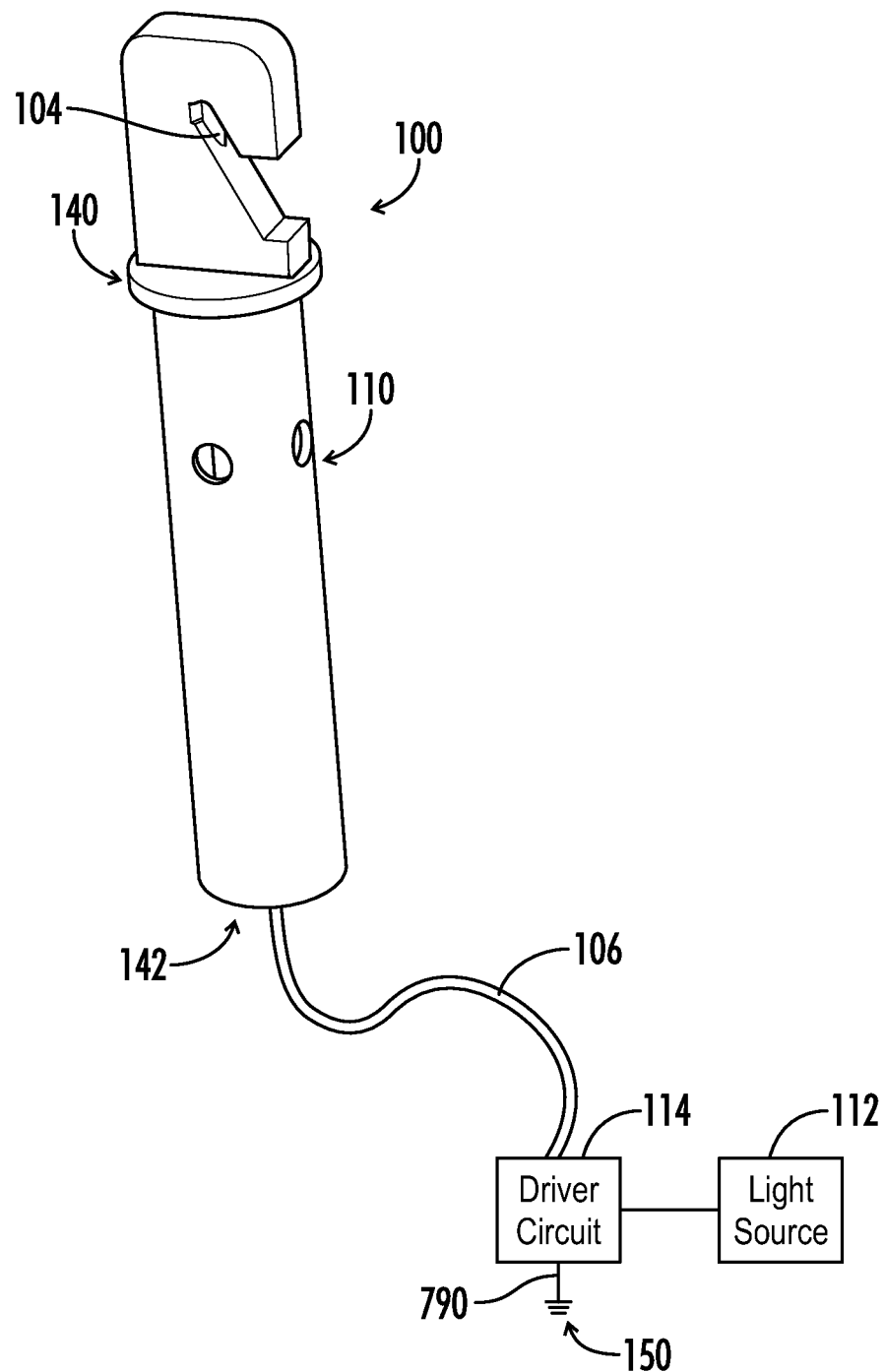
FIG. 3 is an isometric view of an electric fence monitor operable to provide an audible indicator of an operating condition of an electric fence.

Referring to FIGS. 1 and 3, an electric fence monitor 100 is operable to provide a visual indicator and an audible indicator of an operating condition of an electric fence 102. The electric fence monitor 100 includes a first contact 104, a second lead 106 connected to a second contact 108, a housing 110, a light source 112, a driver circuit 114, and a base 116. The first contact 104 is operable to connect to the electric fence 102. The electric fence 102 is periodically energized by an electric fence charger 120. A length of the electric fence 102 separates the fence charger 120 from the first contact 104. The second contact 108 is separated from the first contact 104 by an air gap 130. The air gap 130 has a distance 132 less than a critical distance. The critical distance is the distance at which an arc will no longer formed between the first contact 104 and the second contact 108 when the electric fence charger 120 energized as the electric fence 102. Because the air gap 130 has a distance 132 less than the critical distance, an arc forms in the air gap 130 when the electric fence charger 120 energizes the electric fence 102, as long as there is not a fault on the length of electric fence 102 separating the fence charger 120 from the first contact 104. Examples of faults that could be on the length of electric fence 102 include an open circuit (i.e., a broken fence) and a short-circuit to ground (i.e., an object laying on the fence and the ground or hanging from the fence to the ground).

The housing 110 has a first end 140 and a second end 142. The second end 142 is opposite the first end 140. The housing 110 is operable to support the first contact 104 and the second contact 108. The housing 110 is enclosed at the first end 140 and open at the second end 142 such that the electric fence monitor 100 admits an audible knock when the arc forms in the air gap 130.

The light source 112 is operable to provide light in response to receiving power. In one embodiment, the light source includes a plurality of light emitting diodes (LEDs) 220 and a core 230. Each LED 220 of the plurality of LEDs is configured to receive power from the driver circuit 114. The court 230 is operable to support the plurality of LEDs to 20. The plurality of LEDs 220 are arranged about the core 230 such that when the electric fence monitor 100 is secured to the fence post 160 in an upright orientation (see FIG. 1), the light emitted by the light source 112 is visible from any point above a horizontal plane through the light source 112. As can be seen in FIG. 1, light emitted by the light source 112 is also visible from many points below the horizontal plane through the light source 112. This enables a fence owner to determine the operating condition of the electric fence 102 from a position on the ground, from a mounted position, or from the air (e.g., by helicopter). The brightness of the LEDs 220 and ability to see the light source 112 from above the fence monitor 100 enables the visual indicator to be seen from a great distance. For large ranches that need to check multiple, separate fences powered by separate fence chargers, this enables the rancher to check the entire fence line from a continuous flight in a helicopter, or from a continuous ride in a mounted position (e.g., horseback or all terrain vehicle).

The driver circuit 114 is connected between the second lead 106 and a ground 150 (e.g., earth ground). The driver circuit 114 is operable to receive electricity passing through the air gap 130 via the second lead 106. The driver circuit 114 provides power to the light source 112 by converting the received electricity such that the electric fence monitor 100 emits a flash of light each time that the arc forms in the air gap 130 and transfers power to the driver circuit 114 from the electric fence 102 (and ultimately from the electric fence charger 120).

The base 116 is operable to support the light source 112 and the driver circuit 114. The base 116 is also operable to secure to a surface such as a fence post 160. In one embodiment, the base 116 has a fitting operable to slip over the top of a steel safety post. In one embodiment, the base has a threaded portion 304. The threaded portion 304 is operable to receive a globe 302.

In one embodiment, the electric fence monitor 100 further includes the globe 302 operable to engage the base 116. The globe 302 may be glass or some other substantially transparent material. The globe 302 cooperates with the base 116 to enclose the light source 112 and driver circuit 114 such that it prevents precipitation from contacting the light source 112 or driver circuit 114. In one embodiment, the globe 302 has approximately 5 threads branch, a thread height of approximately 0.060 inches, a thread top radius of approximately 0.044 inches, a base corner route radius of approximately 0.030 inches, thread sides approximately 30° from vertical, and an inside diameter of approximately 2⅜ inches. The threaded portion 304 of the base 116 is operable to receive a globe 302. It is contemplated that other thread patterns may be used, for example, wide-mouth canning jar threads (e.g., approximately 3 inches inside diameter).

In one embodiment, the base 116 is operable to substantially enclose the first contact 104 and the second contact 108. In one embodiment, first contact 104 and the second contact 108 are embodied by a spark plug 400 inserted into the base 116. The electrode of the spark plug 400 ax as the first contact 104, and the threads of the spark plug 400 are part of the second contact 108. In this embodiment, a first lead directly connects the first contact 104 to the electric fence 102, and the electric fence monitor 100 is not capable of producing a substantial audible indicator.

Figure 4:
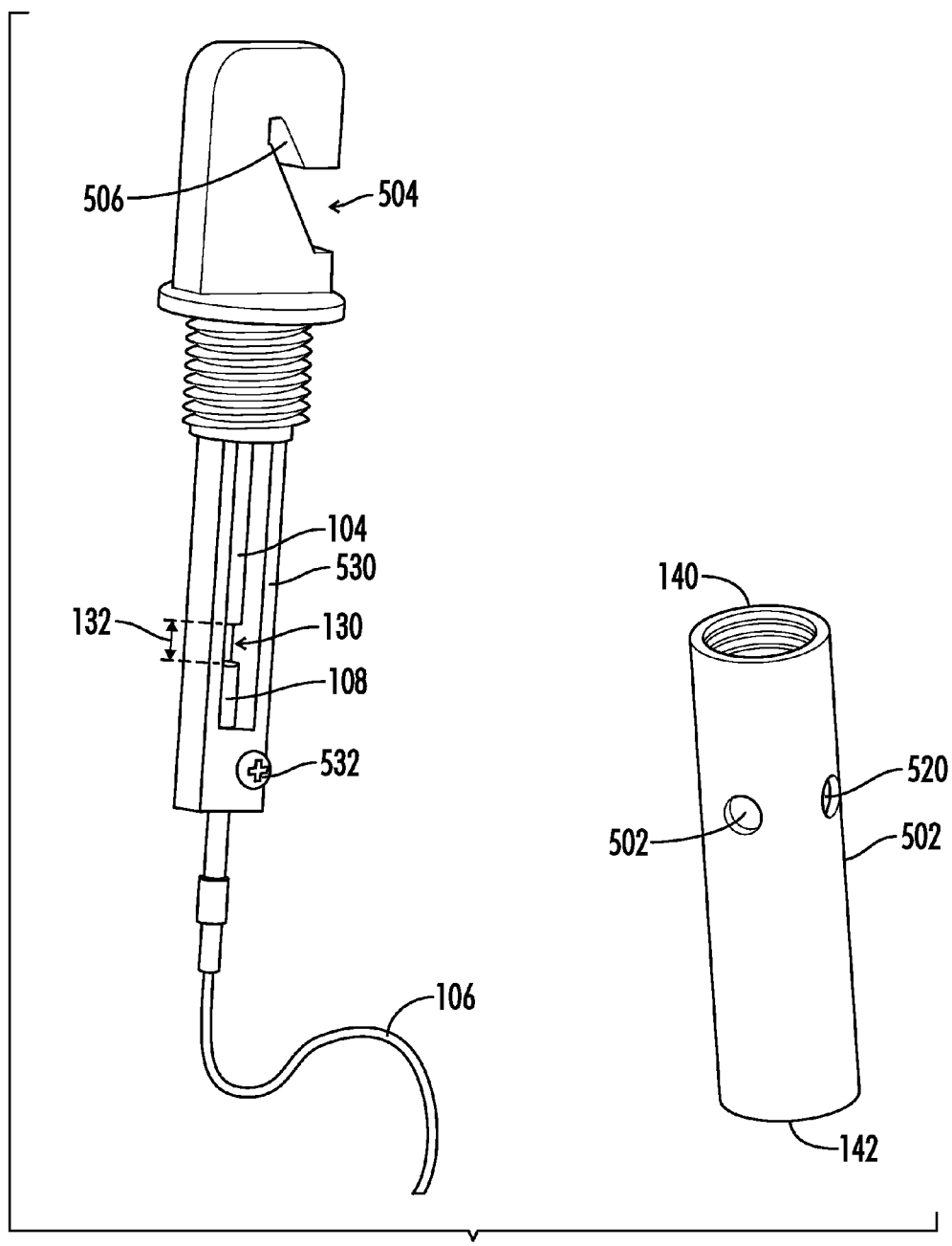
FIG. 4 is a partially exploded isometric view of an electric fence monitor operable to provide an audible indicator of an operating condition of an electric fence of FIG. 3.

Referring to FIGS. 3 and 4, one embodiment of the housing 110 is shown in further detail. The housing 110 includes a tubular portion 502 and an end cap 504. The tubular portion 502 is approximately two inches long with approximately one half inch inside diameter. The end cap 504 is at the first end 140 of the housing 110. The end cap 504 includes a hook 506 configured to hang the housing 110 on the electric fence 102 with the first contact 104 electrically connected to the electric fence 102 and the first end 140 of the housing 110 above the second end 142 of the housing 110. In one embodiment, the end cap 504 adds approximately one half inch to the length of the tubular portion 5024 and overall length of approximately 2½ inches. In one embodiment, the tubular portion 502 has one or more holes 520 therethrough. The holes 520 in the housing 110 tune the knocking sound of the arc in the air gap 130 and project the knocking sound horizontally from the housing 110. In one embodiment, the length of the tubular portion 502 and the location and size of the holes 520 combined to tune a frequency of the knocking sound of the arc in the air gap 130 to a predetermined frequency. The predetermined frequency is selected to maximize projection of the knocking sound produced by the arc in the air gap 130. Generally, this knock can be heard from a significant distance (e.g., in excess of 100 yards, depending on terrain and background noise).

In one embodiment, the housing 110 further includes a vise 530 and a retainer screw 532. The vise 530 is configured to maintain the first contact 104 and the second contact 108 at the distance of the air gap 130. That is, the vise 530 maintains a predetermined distance between the first contact 104 and the second contact 108 during normal operation. The retainer screw 532 is configured to close the vise 530 on at least one of the first contact 104 and the second contact 108. That is, the retainer screw 532 clamps the vise 530 down on at least one of the contacts to hold them in position during normal operation. Thus, the distance of the air gap 130 is adjustable by unscrewing the end cap 504 from the tubular portion 502 of the housing 110, loosening the retainer screw 532, moving the first and second contacts 104, 108 closer or further apart, tightening the retainer screw 532, and screwing the end cap 504 back onto the tubular portion 502 of the housing 110.

Figure 5:
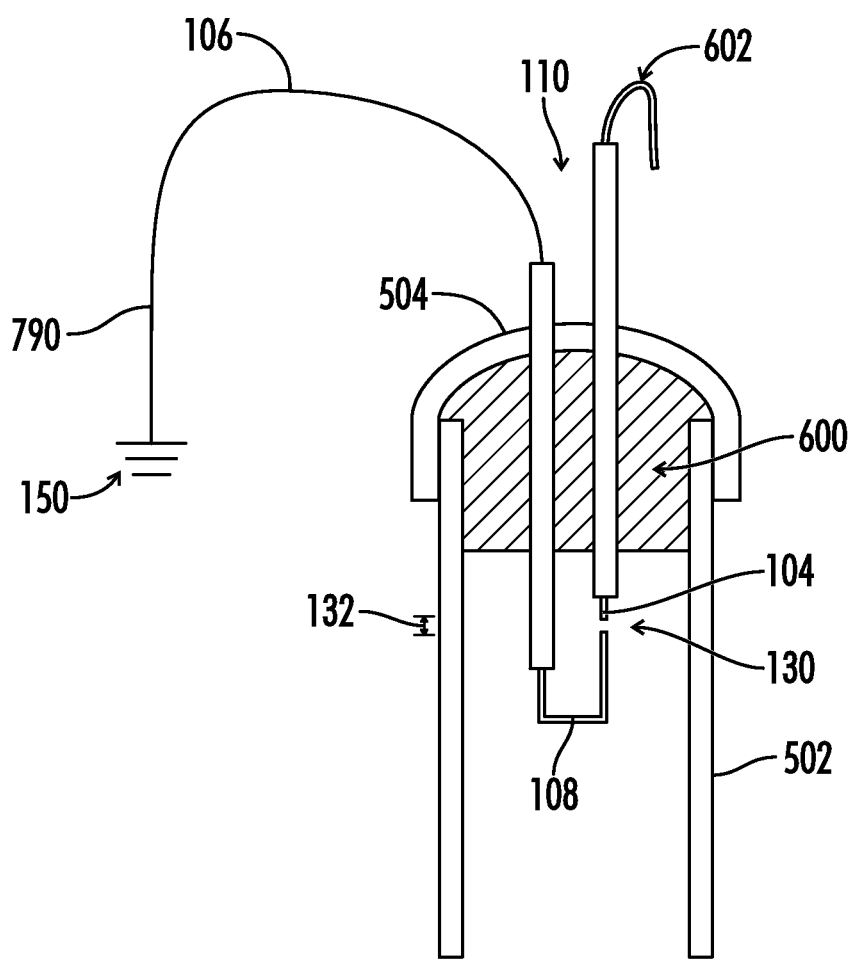
FIG. 5 is a side cutaway view of an electric fence monitor operable to provide an audible indicator of an operating condition of an electric fence.

Referring to FIG. 5, alternative features of the housing 110 are shown. In the embodiment of FIG. 5, at least one of the first lead 602 and the second lead 106 penetrate the end cap 504. The end cap 504 is substantially filled with a hardening compound 600 (e.g., epoxy or silicon). The hardening compound 600 at least partially encapsulates one of the first lead 602 and the second lead 106. In one embodiment, the first lead 602 forms a hook for engaging the electric fence 102 and hanging the housing 110 from the electric fence 102. In another embodiment, a clamp is connected to the first lead 602, and the clamp is operable to engage the electric fence (i.e., or clip onto the electric fence 102), conduct electricity to the first lead 602, and hang the housing 110 from the electric fence 102 with the first end 140 of the housing 110 above the second end 142 of the housing 110.

Figure 6:
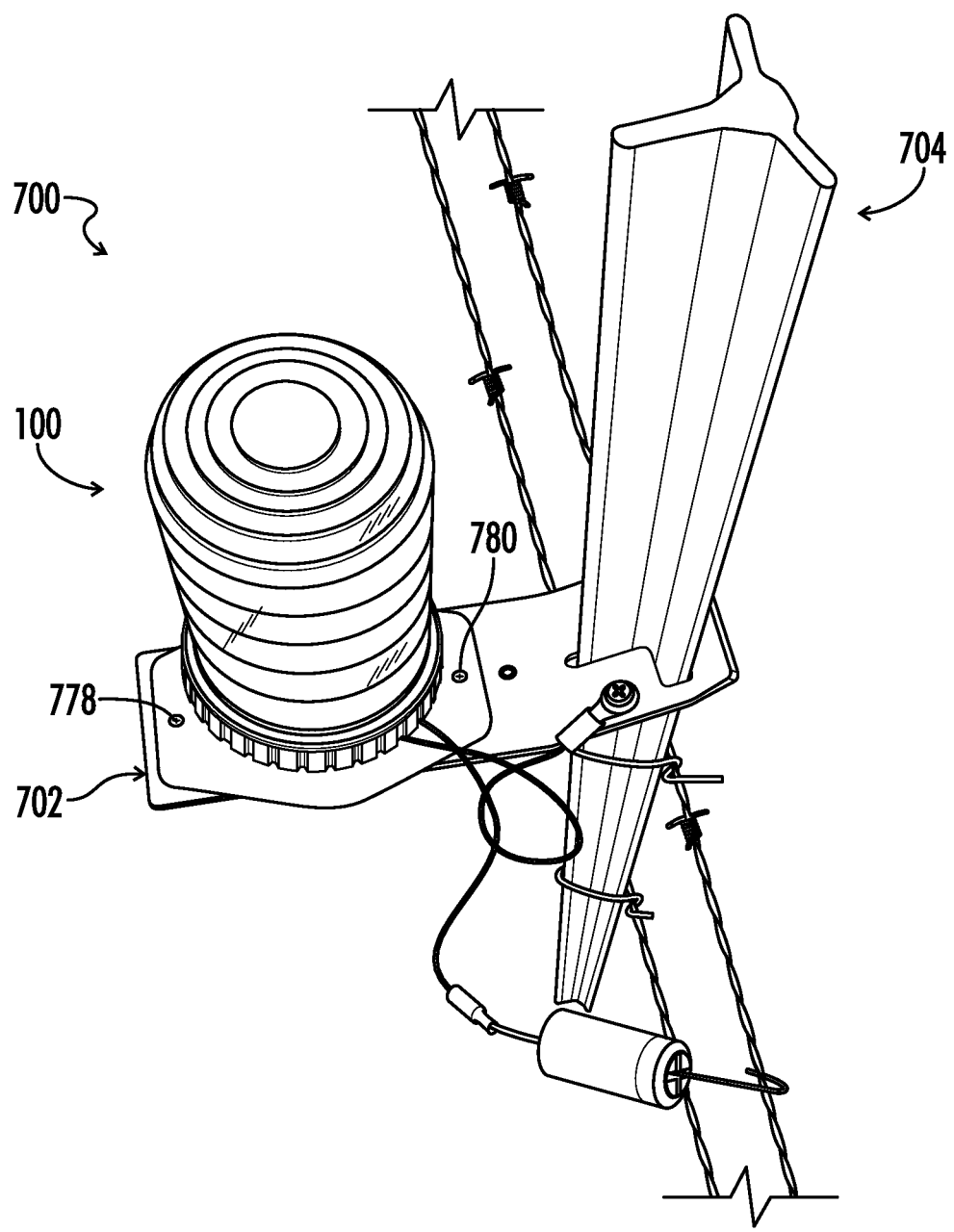
FIG. 6 is an elevated side perspective view of an electric fence monitoring system.
Figure 9:
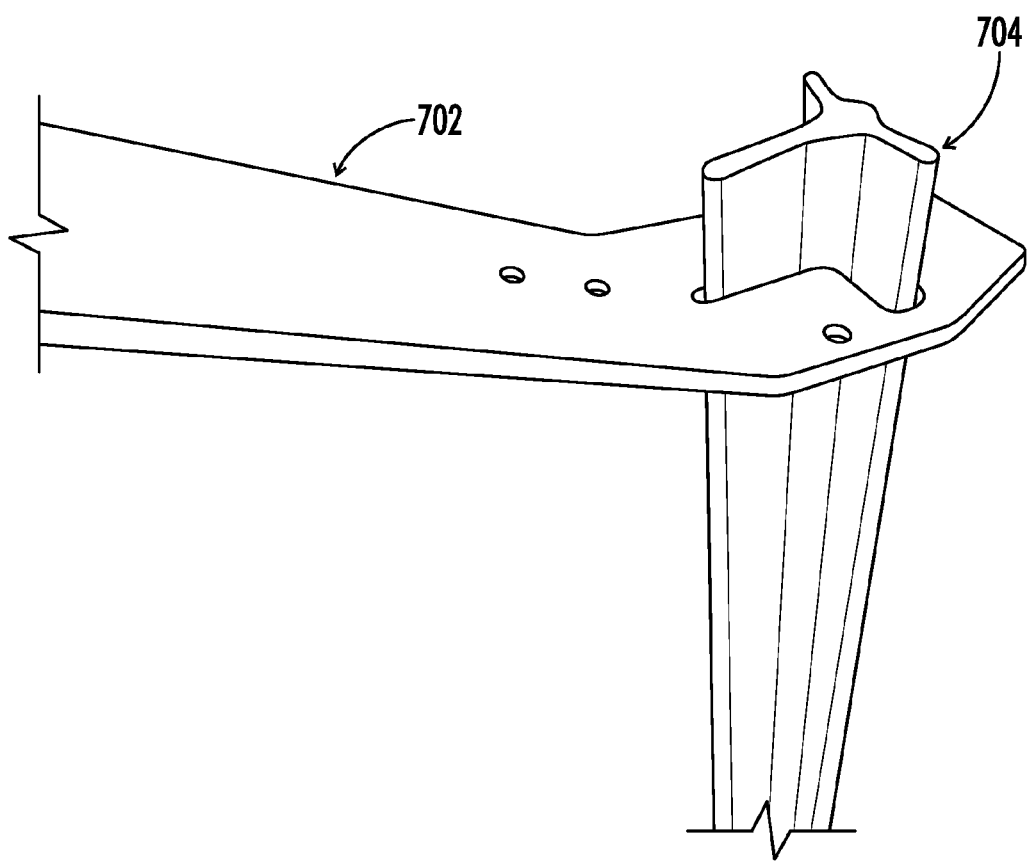
FIG. 9 is an isometric view of the mounting bracket of FIG. 7 being positioned on a T-post.
Figure 10:
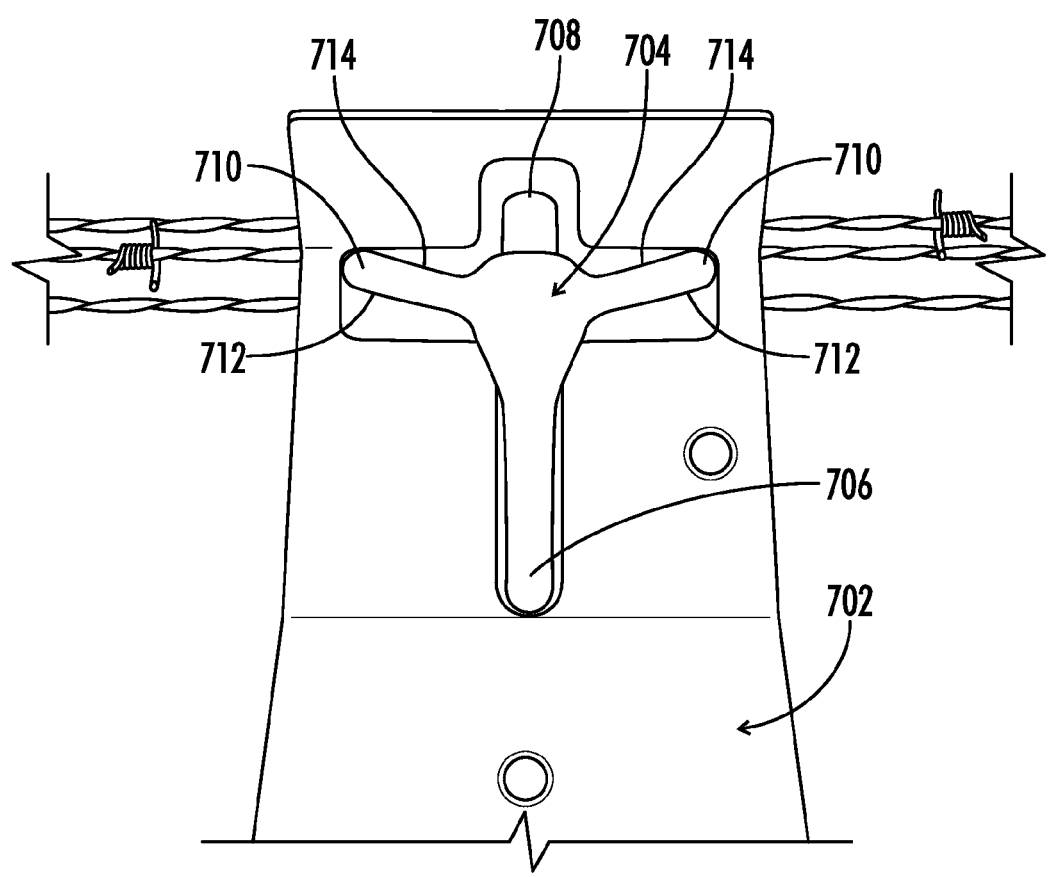
FIG. 10 is an overhead perspective view of the mounting bracket being positioned on the T-post in FIG. 9.

Referring to FIG. 6, an electric fence monitoring system 700 includes the electric fence monitor 100 and an electric fence monitoring mounting bracket 702 (i.e., mounting bracket or bracket). The mounting bracket 702 is mounted to a standard steel T-post 704 (e.g., safety post). The mounting bracket 702 is configured to mount onto the T-post 704 by sliding a recess in the mounting bracket 702 over a top of the T-post 704. The T-post 704 has a vertical axis extending centrally along the largest dimension of the T-post 704. As used herein, a longitudinal axis of the T-post 704 refers to any line in a plane extending centrally through a frontal protrusion 706 and a stud 708 of the T-post 704. The T-post 74 has a plurality of studs in the plane defining the longitudinal axis. The T-post includes a central member 710 extending perpendicularly from the longitudinal axis along the vertical axis, and the central member 710 has a front face 712 and a rear face 714. The frontal protrusion 706 extends from the front face 712 of the central member 710 along the longitudinal axis, and the studs 708 extend from the rear face 714 of the central member 710 along the longitudinal axis. In one embodiment, the central member 710 is approximately 1.5 inches wide and 0.25 inches long, the frontal protrusion 706 is approximately 1.5 inches long and 3/16 inches wide, and the stud 708 is approximately 0.25 inches wide and 0.25 inches long. When the mounting bracket 702 is at a first angle relative to a vertical axis of the T-post 704, the recess in the mounting bracket 702 receives the T-post 704, and the mounting bracket 702 may be moved up or down the T-post 704 along the vertical axis (see FIGS. 9 and 10). When the mounting bracket 702 is at a second angle relative to the vertical axis of the T-post 704, the mounting bracket 702 is prevented from moving up or down the T-post 704 by friction between the mounting bracket 702 and the T-post 704 and via mechanical interference between the mounting bracket 702 and at least one stud 708 of the T-post 704.

Figure 7:
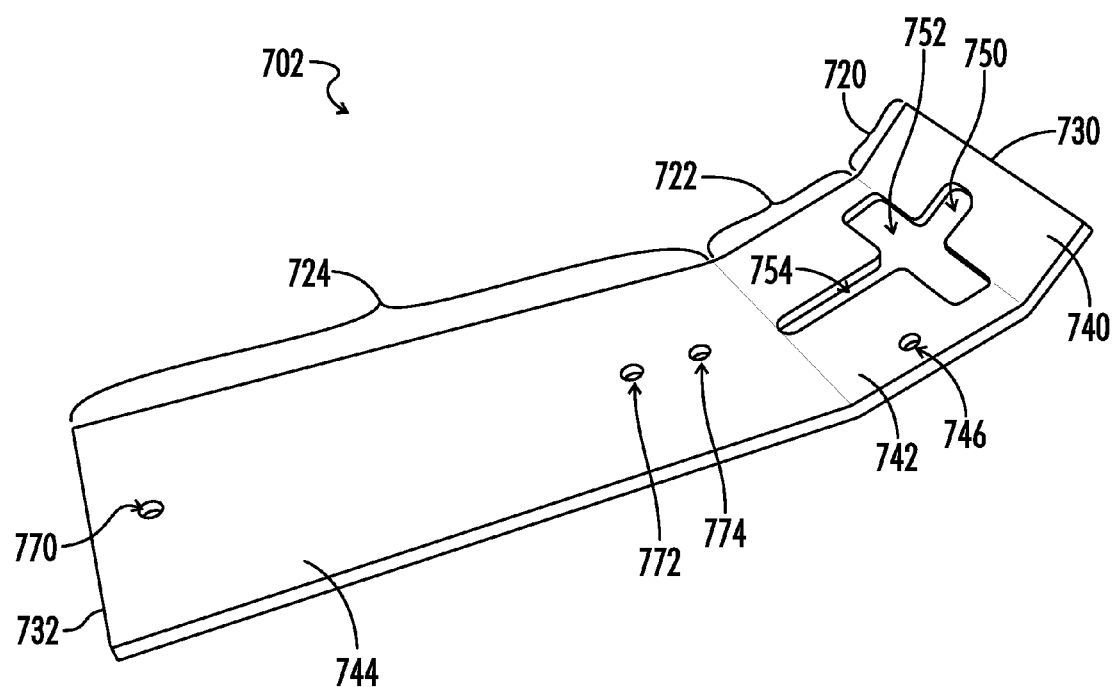
FIG. 7 is an isometric view of an electric fence monitor mounting bracket.
Figure 8:
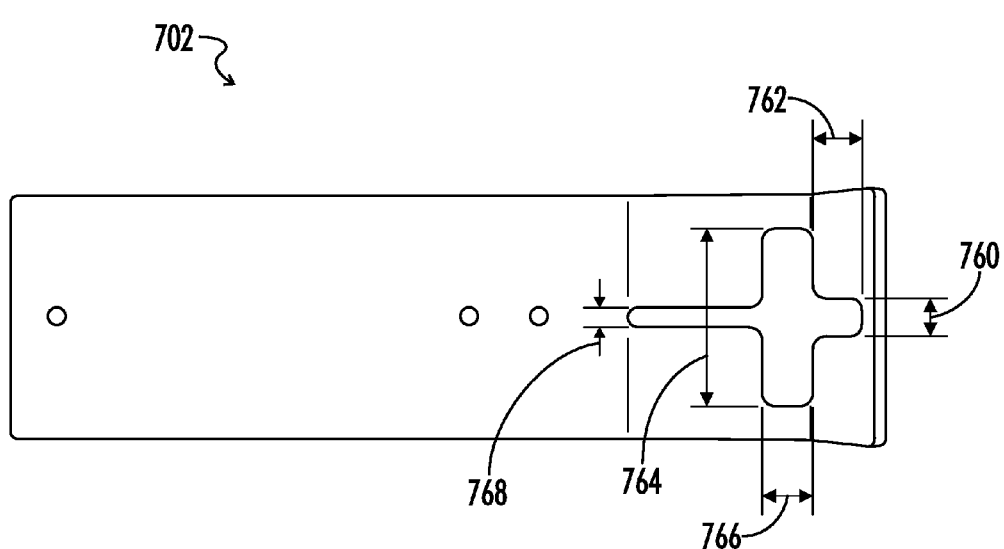
FIG. 8 is a top perspective view of the electric fence monitor mounting bracket of FIG. 7.

Referring to FIGS. 7 and 8, the mounting bracket 702 includes a first segment 720, a second segment 722, and a third segment 724. The first segment 720 is at a distal end 730 of the mounting bracket 702. In one embodiment, the first segment 720 defines a first plane (i.e., is generally planar). That is, the first plane is defined by a top surface 740 of the first segment 720 of mounting bracket 702. The first segment 720 includes a first recess 750 extending therethrough. A width 760 of the first recess 750 is at least as wide as the stud 708 of the T post 704. A length 762 of the first recess 750 is at least as long as the stud 708 of the T post 704.

Figure 11:
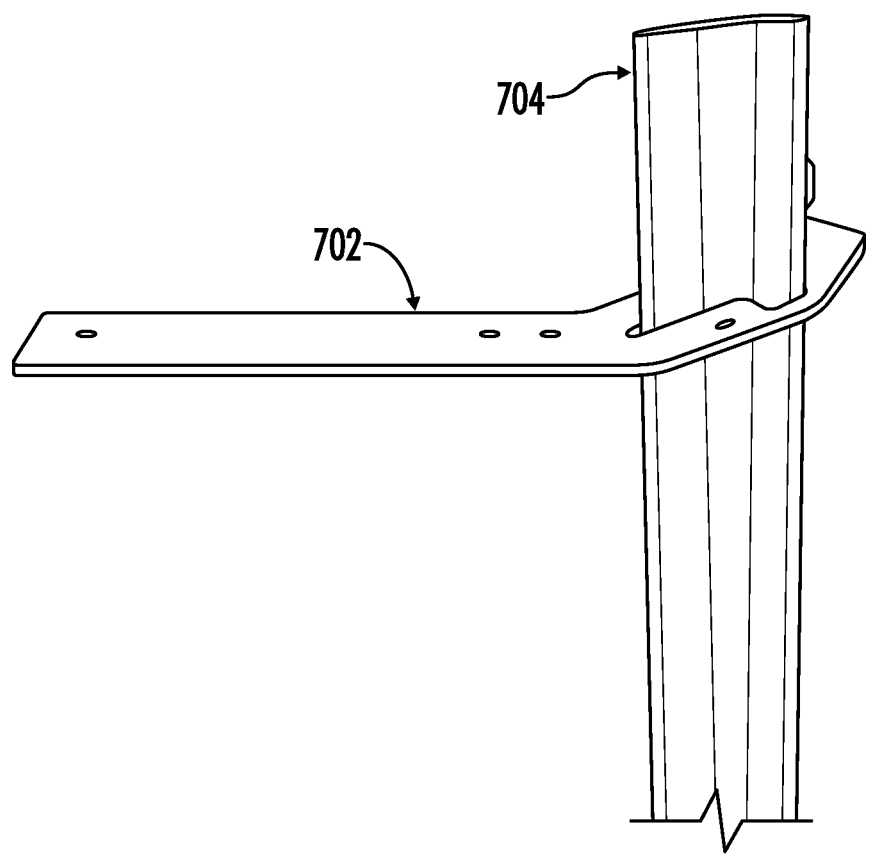
FIG. 11 is a side perspective view of the mounting bracket of FIG. 7 mounted on a T-post.
Figure 12:
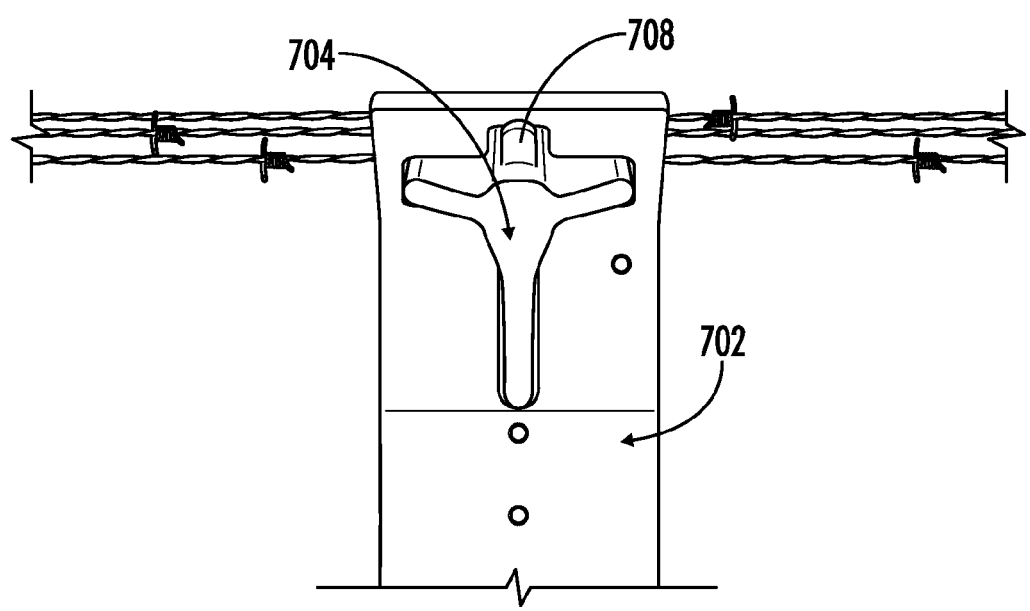
FIG. 12 is an overhead perspective view of the mounting bracket mounted on the T-post in FIG. 11.

The second segment 722 includes a second recess 752 and a third recess 754 extending therethrough. In one embodiment, the second segment 722 defines a second plane (i.e., is generally planar). That is, the second plane is defined by a top surface 742 of the second segment 722. The second recess 752 has a width 764 at least as wide as the central member 710 of the T-post 704 and a length 766 at least 1.25 times as long as the central member 710 of the T-post. The third recess 754 has a width 768 at least as wide as the frontal protrusion 706 of the T-post 704 and a length at least 1.25 times as long as the frontal protrusion 706 of the T-post 704. The first recess 750 is open to the second recess 752, and the second recess 752 is open to the third recess 754. The first, second, and third recesses thus form a continuous single opening through the mounting bracket 702. In one embodiment, the second segment 722 further includes a grounding hole 764. The grounding hole 764 is configured to receive a ground connection from a ground lead 790 of the electric fence monitor 100 (e.g., is bolted to the mounting bracket 702 through the grounding hole 776. The ground lead 790 electrically connects the electric fence monitor 100 to earth ground 150 via the mounting bracket 702 and T-post 704. In one embodiment, the grounding hole 776 does not align with the longitudinal axis of the T-post 704 when the mounting bracket 702 is mounted to the T-post 704. In one embodiment, the first plane defined by the first segment 720 intersects the second plane defined by the second segment at an angle of between approximately 130 and 150 degrees (e.g., approximately 140 degrees) as measured from a top of the first plane to a top of the second plane (see, for example, FIG. 11).

The third segment 724 is at a proximal end 732 of the mounting bracket 702. In one embodiment, the third segment 724 defines a third plane (i.e., is generally planar). That is, the third plane is defined by a top surface 744 of the third segment 724. The third segment 724 is connected to the first segment 720 via the second segment 722. In one embodiment, the first, second, and third segments are integral with one another in that the mounting bracket 702 is stamped or machined from a single piece of metal (e.g., steel). In one embodiment, the third segment 724 includes a first mounting hole 770, a second mounting hole 772, and a third mounting hole 774 which are all disposed along the longitudinal axis of the T-post 704 when the mounting bracket 702 is mounted on the T-post 704. The first hole 770 corresponds to a first mounting hole 778 in the base 116 of the electric fence monitor 100, and the second mounting hole 768 corresponds to a second mounting hole 780 in the base 116 of the electric fence monitor 100. The first and second mounting holes of the third segment 724 are configured to correspond to the first and second mounting holes in the base 116 of the electric fence monitor 100 such that the electric fence monitor 100 can be secured to or mounted on the mounting bracket 702 by bolting the base 116 to the mounting bracket 702. The third mounting hole 774 is used in conjunction with the first mounting hole 770 to secure a different sized (i.e., larger) base 116 to the third segment 724. In one embodiment, the third segment 724 is configured to extend generally perpendicular to the longitudinal axis and the vertical axis of the T-post 704 when mounted on the T-post 702 such that the third plane is generally parallel to the ground (i.e., level). In one embodiment, the mounting holes are not located along the longitudinal axis of the T-post 704 when the mounting bracket 702 is mounted on the T-post 704, and the third mounting hole 774 is merely distal with respect to the second mounting hole 772. In one embodiment, the second plane defined by the second segment 722 intersects the third plane defined by the third segment 724 at an angle of between approximately 150 and 170 degrees (e.g., approximately 160 degrees) as measured from a top of the third plane to a top of the second plane (see, for example, FIG. 11).

In one embodiment, the second recess 752 extends distally of the second segment 722 into the first segment 720. This adds clearance when the mounting bracket 702 is being moved down onto the T-post 704 with the T-post 704 extending thorough the recess in the mounting bracket 702. In one embodiment, to further aid ease of mounting, corners formed between the first recess 750 and the second recess 752 and between the second recess 752 and the third recess 754 are generally rounded.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful MOUNTING BRACKET FOR AN ELECTRIC FENCE MONITOR INCLUDING AN AIR GAP it is not intended that such references be construed as limitations upon the scope of this invention except as set forth in the following claims.

What is claimed is:

1. An electric fence monitor mounting bracket configured to support an electric fence monitor on a T-post having a central member, a frontal protrusion extending from a front face of the central member along a longitudinal axis of the T-post, and a stud protruding from a rear face of the central portion along the longitudinal axis of the T-post, said electric fence monitor mounting bracket comprising:
   a first segment at a distal end of the bracket, wherein the first segment is planar and comprises a first recess extending therethrough having a width at least as wide as the stud of the T-post and a length at least as long as the stud of the T-post;
   a second segment comprising:
      a second recess extending therethrough, wherein the second recess has a width at least as wide as the central member of the T-post and a length at least 1.25 times a length of the central member of the T-post; and
      a third recess extending therethrough, wherein the third recess has width at least as wide as the frontal protrusion of the T-post and a length at least 1.25 times a length of the frontal protrusion of the T-post, and wherein the first recess is open to the second recess and the second recess is open to the third recess; and
   a third segment at a proximal end of the bracket configured to support the electric fence monitor, wherein the second segment connects the first segment to the third segment.

2. The electric fence monitor mounting bracket of claim 1, wherein the third segment comprises a first mounting hole and a second mounting hole spaced apart from the first mounting hole, said first and second mounting holes configured to correspond to a first mounting hole and a second mounting hole, respectively of a base of the electric fence monitor.

3. The electric fence monitor mounting bracket of claim 1, wherein the third segment comprises a first mounting hole and a second mounting hole spaced apart from the first mounting hole, said first and second mounting holes configured to correspond to a first mounting hole and a second mounting hole, respectively of a base of the electric fence monitor, wherein the first and second mounting holes of the third segment of the mounting bracket align with the longitudinal axis of the T-post when the mounting bracket is mounted on the T-post; and
   wherein the second segment comprises a grounding hole extending therethrough, said grounding hole configured to receive a ground connection from the electric fence monitor and electrically connect the electric fence monitor to earth ground via the T-post.

4. The electric fence monitor mounting bracket of claim 1, wherein:
   the third segment comprises a first mounting hole and a second mounting hole spaced apart from the first mounting hole, said first and second mounting holes configured to correspond to a first mounting hole and a second mounting hole, respectively of a base of the electric fence monitor, wherein the first and second mounting holes of the third segment of the mounting bracket align with the longitudinal axis of the T-post when the mounting bracket is mounted on the T-post; and
   the third segment further comprises a third mounting hole aligned with the longitudinal axis of the T-post when the mounting bracket is mounted on the T-post, wherein the third mounting hole is distal of the second mounting hole such that the mounting bracket is configured to receive at least two different size bases of electric fence monitors.

5. The electric fence monitor mounting bracket of claim 1, wherein third segment comprises a first mounting hole and a second mounting hole spaced apart from the first mounting hole, said first and second mounting holes configured to correspond to a first mounting hole and a second mounting hole, respectively of a base of the electric fence monitor, wherein the first and second mounting holes of the third segment of the mounting bracket align with the longitudinal axis of the T-post when the mounting bracket is mounted on the T-post; and
   wherein the second segment comprises a grounding hole extending therethrough, said grounding hole configured to receive a ground connection from the electric fence monitor and electrically connect the electric fence monitor to earth ground via the T-post, wherein the grounding hole is in the second segment of the mounting bracket and the grounding hole does not align with the longitudinal axis of the T-Post when the mounting bracket is mounted on the T-post.

6. The electric fence monitor mounting bracket of claim 1, wherein:
the first segment defines a first plane;
the second segment defines a second plane; and
a top of the first plane intersects a top of the second plane at an angle of between 130 and 150 degrees.

7. The electric fence monitor mounting bracket of claim 1, wherein:
the first segment defines a first plane;
the second segment defines a second plane; and
a top of the first plane intersects a top of the second plane at an angle of 140 degrees.

8. The electric fence monitor mounting bracket of claim 1, wherein:
the second segment defines a second plane;
the third segment defines a third plane; and
a top of the first plane intersects a top of the third plane at an angle of between 150 and 170 degrees.

9. The electric fence monitor mounting bracket of claim 1, wherein:
the second segment defines a second plane;
the third segment defines a third plane; and
a top of the first plane intersects a top of the third plane at an angle of 160 degrees.

10. The electric fence monitor mounting bracket of claim 1, wherein the second recess extends distally of the second segment into the first segment.

11. The electric fence monitor mounting bracket of claim 1, wherein:
corners formed in the mounting bracket at an interface of the third recess to the second recess are rounded; and
corners formed in the mounting bracket at an interface of the first recess to the second recess are rounded.

12. The electric fence monitor mounting bracket of claim 1, further comprising the electric fence monitor attached to the mounting bracket, wherein the mounting bracket is mounted on the T-post, and a ground lead of the electric fence monitor is attached to the mounting bracket at a grounding hole of the mounting bracket such that the electric fence monitor is grounded via the mounting bracket and T-post.

13. An electric fence monitoring system comprising:
an electric fence monitor operable to provide a visual indicator and an audible indicator of an operating condition of an electric fence; and
an electric fence monitor mounting bracket configured to support the electric fence monitor on a T-post having a central member, a frontal protrusion extending from a front face of the central member along a longitudinal axis of the T-post, and a stud protruding from a rear face of the central portion along the longitudinal axis of the T-post, said electric fence monitor mounting bracket comprising:
a first segment at a distal end of the bracket, wherein the first segment is planar and comprises a first recess extending therethrough having a width at least as wide as the stud of the T-post and a length at least as long as the stud of the T-post;
a second segment comprising:
a second recess extending therethrough, wherein the second recess has a width at least as wide as the central member of the T-post and a length at least 1.25 times a length of the central member of the T-post; and
a third recess extending therethrough, wherein the third recess has width at least as wide as the frontal protrusion of the T-post and a length at least 1.25 times a length of the frontal protrusion of the T-post, and wherein the first recess is open to the second recess and the second recess is open to the third recess; and
a third segment at a proximal end of the bracket configured to support the electric fence monitor, wherein the second segment connects the first segment to the third segment.

14. The electric fence monitoring system of claim 13, wherein the electric fence monitor comprises:
a first contact, wherein:
the first contact is operable to connect to the electric fence;
the electric fence is periodically energized by an electric fence charger;
a length of the electric fence separates the fence charger from the first contact;
a second lead connected to a second contact, wherein:
the second contact is separated from the first contact by an air gap;
the air gap has a distance less than a critical distance such that an arc forms in the air gap when the electric fence charger energizes the electric fence and there is not a fault on the length of electric fence separating the fence charger from the first contact;
a housing having a first end and a second end opposite the first end, wherein:
the housing is operable to support the first contact and the second contact; and
the housing enclosed at the first end, and open at the second end such that the electric fence monitor emits an audible knock when the arc forms in the air gap;
a light source operable to provide light in response to receiving power;
a driver circuit connected between the second lead and a ground, wherein:
the driver circuit is operable to receive electricity passing through the air gap via the second lead; and
the driver circuit is operable to provide power to the light source by converting the received electricity such that the electric fence monitor emits a flash of light when the arc forms in the air gap and transfers power to the driver circuit; and
a base operable to support the light source and driver circuit and secure to the mounting bracket.

15. The electric fence monitor system of claim 14, wherein:
the housing comprises:
a tubular portion 2 inches long with ½ inch inside diameter;
an end cap at the first end of the housing, said end cap including a hook configured to hang the housing on the electric fence with the first contact electrically connected to the electric fence and the first end of the housing above the second end of the housing, wherein the end cap is ½ inch long;
a vise configured to maintain the first contact and the second contact at the distance of the air gap; and
a retainer screw configured to close the vise on at least one of the first contact and the second contact; and
the distance of the air gap is adjustable by unscrewing the end cap from the tubular portion of the housing, loosening the retainer screw, moving the first and second contacts closer or further apart, tightening the retainer screw, and screwing the end cap back onto the tubular portion of the housing.

16. The electric fence monitoring system of claim 13, wherein the third segment comprises a first mounting hole and a second mounting hole spaced apart from the first mounting hole, said first and second mounting holes configured to correspond to a first mounting hole and a second mounting hole, respectively of a base of the electric fence monitor, wherein the first and second mounting holes of the third segment of the mounting bracket align with the longitudinal axis of the T-post when the mounting bracket is mounted on the T-post; and wherein the second segment comprises a grounding hole extending therethrough, said grounding hole configured to receive a ground connection from the electric fence monitor and electrically connect the electric fence monitor to earth ground via the T-post, wherein the grounding hole is in the second segment of the mounting bracket and the grounding hole does not align with the longitudinal axis of the T-Post when the mounting bracket is mounted on the T-post.

17. The electric fence monitoring system of claim 13, wherein:
the first segment defines a first plane;
the second segment defines a second plane;
the third segment defines a third plane;
a top of the first plane intersects a top of the second plane at an angle of between 130 and 150 degrees; and
a top of the third plane intersects the top of the second plane at an angle of between 150 and 170 degrees.

18. The electric fence monitoring system of claim 13, wherein:
the first segment defines a first plane;
the second segment defines a second plane;
the third segment defines a third plane;
a top of the first plane intersects a top of the second plane at an angle of 140 degrees; and
a top of the third plane intersects the top of the second plane at an angle of 160 degrees.

19. The electric fence monitoring system of claim 13, wherein the second recess extends distally of the second segment into the first segment.

20. The electric fence monitoring system of claim 13, wherein:
corners formed in the mounting bracket at an interface of the third recess to the second recess are rounded; and
corners formed in the mounting bracket at an interface of the first recess to the second recess are rounded.

* * * * *